United States Patent [19]
Boccagno et al.

[11] Patent Number: 5,556,471
[45] Date of Patent: Sep. 17, 1996

[54] METHOD AND APPARATUS FOR DISPENSING FOAM MATERIALS

[75] Inventors: George E. Boccagno, Lawrenceville, Ga.; Lawrence B. Saidman, Avon Lake; Robert L. Wacker, Wellington, both of Ohio

[73] Assignee: Nordson Corporation, Westlake, Ohio

[21] Appl. No.: 245,225

[22] Filed: May 17, 1994

[51] Int. Cl.⁶ ......................................................... B05B 1/00
[52] U.S. Cl. ............................ 118/300; 118/410; 239/137
[58] Field of Search ..................................... 118/300, 410, 118/411, 683, 684; 222/504, 146.5, 145.1, 145.5, 145.6; 239/135, 137, 592, 593, 597; 261/DIG. 26; 264/50; 156/77, 78, 356, 578

[56] References Cited

U.S. PATENT DOCUMENTS

| | | | |
|---|---|---|---|
| 4,059,466 | 11/1977 | Scholl et al. ............................... | 156/78 |
| 4,059,714 | 11/1977 | Scholl et al. ........................... | 428/317.5 |
| 4,061,001 | 12/1977 | von der Eltz et al. .......... | 261/DIG. 26 |
| 4,073,409 | 2/1978 | Gardner et al. . | |
| 4,431,690 | 2/1984 | Matt et al. ................................ | 118/683 |
| 4,470,789 | 9/1984 | Whittington et al. ..................... | 264/50 |
| 4,630,774 | 12/1986 | Rehman et al. ............................. | 239/8 |
| 4,687,137 | 8/1987 | Boger et al. ............................. | 239/124 |
| 4,774,109 | 9/1988 | Hadzimihalis et al. ................ | 427/286 |
| 4,778,631 | 10/1988 | Cobbs, Jr. et al. ...................... | 261/128 |
| 5,000,112 | 3/1991 | Rothen et al. ........................... | 118/411 |
| 5,027,742 | 7/1991 | Lee et al. ................................. | 118/300 |
| 5,207,352 | 5/1993 | Porter et al. ............................... | 222/1 |
| 5,246,433 | 9/1993 | Hasse et al. ............................. | 604/396 |

OTHER PUBLICATIONS

Walter Michaeli, Extrusion Dies for Plastics and Rubber, second revised edition, 1992, pp. 134–150.

*Primary Examiner*—Laura Edwards
*Attorney, Agent, or Firm*—Rankin, Hill, Lewis & Clark

[57] ABSTRACT

A method and apparatus for dispensing a polymer foam includes apparatus for forming a pressurized solution of intermixed polymeric material and gas. The polymeric material remains intermixed with the gas while the solution is maintained above a critical pressure. The pressurized solution is dispensed in wide band through an elongated slot. The dispensing apparatus includes an exit slot section in which the pressure of the solution drops below the critical pressure and the foam begins to form. The solution is maintained above the critical pressure until the solution enters the exit slot section so that premature foaming of the material is prevented.

29 Claims, 5 Drawing Sheets

METHOD AND APPARATUS FOR DISPENSING FOAM MATERIALS

BACKGROUND OF THE INVENTION

1. Field of the Invention

This invention relates to systems for dispensing foam polymer material, and more particularly to systems which maintain the polymer material under pressure with foaming gas in solution and which dispense the polymer/gas solution to form the foam.

2. Description of the Prior Art

The assignee of the present invention has pioneered the development and application of methods and apparatus for foaming and dispensing polymeric materials such as hot melt thermoplastic adhesives, polymeric coatings, paints and other thermoplastic and/or thermosetting materials.

This technology has been used in the application of hot melt adhesives in which it has been found that the adhesive strength of a bond achieved with a given volume of selected hot melt adhesive can be appreciably improved, and in most instances at least doubled, if the adhesive were applied as a foam rather than as a conventional non-foamed adhesive. Foam adhesive systems encompassed by this technology are commercially available from the assignee of the present invention under the trademark FoamMelt®.

A hot melt thermoplastic adhesive foam system is disclosed in U.S. Pat. No. 4,059,466 wherein a solid mixture of hot melt thermoplastic adhesive and blowing agent is heated and melted in a heated reservoir at a temperature above the melting temperature of the adhesive but below the decomposition temperature of the blowing agent. The molten adhesive and solid blowing agent mixture is then pressurized by a gear pump and supplied under pressure as, for example, 300 pounds per square inch (psi) to a hot melt dispenser. Between the pump and the outlet of the hot melt dispenser, the molten adhesive and solid blowing agent mixture is further heated to a higher temperature at which the blowing agent decomposes and evolves as a gas as for example, nitrogen, which at that pressure goes into solution with the liquid adhesive. The pressurized liquid/gas adhesive solution is then supplied to a valved-type outlet at the adhesive dispenser from which the adhesive is dispensed at atmospheric pressure. Upon emerging from the outlet nozzle of the dispenser, the gas evolves from the solution in the form of small bubbles causing the adhesive to expand volummetrically. The resultant adhesive in an uncompressed state sets up as a homogeneous solid foam having gas cells substantially evenly distributed throughout the adhesive.

In U.S. Pat. No. 4,059,714, another hot melt thermoplastic adhesive foam system is disclosed in which the molten adhesive is mixed with a gas and pressurized by either a one-step or two-step gear pump. Within the gear pump, the gas and molten adhesive are thoroughly mixed and the gas is forced under pump outlet pressure into solution with the liquid adhesive. The pressurized liquid/gas adhesive solution is then supplied to a valved-type dispensing gun from which the adhesive is dispensed at atmospheric pressure. Again, upon emerging from the outlet nozzle of the dispenser, the gas evolves from the solution in the form of small bubbles causing the adhesive to expand volummetrically and forming in an uncompressed state a homogeneous solid foam having gas cells evenly distributed throughout the adhesive.

This technology has been very successful in producing foamed adhesives. The insulating effect of the gas bubbles adds to the open time of the adhesive, and reduces its working viscosity. Thus the adhesive spreads easier and covers more surface area, reducing consumption of the adhesive. Other advantages are increased bond strength, longer open times for product positioning, faster set times, stronger bonding to porous or irregular surfaces, improved bonding to conductive materials, reduced adhesive consumption, increased production rates, lowered labor costs and better product appearance.

The extension of this technology to other polymeric materials, such as thermoset sealant materials presented certain problems. Whereas hot melt adhesives have a viscosity typically in the range of about 2,200 cps to 20,000–35,000 cps, "high" viscosity polymeric material such as thermoset materials used as adhesives, seals and gasketing material have viscosities in the range of about 50,000 cps to about 1,000,000 cps. The low viscosity foaming gas is more difficult to mix successfully with the highly viscous sealant material so as to achieve a uniform solution without creating undesirable heat and other problems. Many of these difficulties were solved by using a bulk mixer and associated apparatus as described in U.S. Pat. No. 4,778,631, to Cobbs, Jr., et al., wherein a low energy input disc mixer is employed to force the low viscosity foaming gas into solution with the "high" viscosity polymeric material. The mixer may be driven by a constant speed motor, which is monitored by a torque sensor. The mixing apparatus may also require a bulk melter for the material that is fed to the mixer, a cooling system with a supply of cooling fluid, and a pressurized supply of foaming gas including a pump. The apparatus uniformly blends the foaming gas with curable sealant materials to produce high-performance gaskets. When the solution is released to atmosphere, a homogeneous foam is formed wherein the gas is released from solution and becomes entrapped in the polymer.

Systems for producing foams of such "high" viscosity materials are commercially available from the assignee of the present invention under the trademark FoamMix®. The systems can produce sealants that are foamed in place, creating closed-cell foam seals that act as effective, long-lasting barriers against air, dust, vapor and fluids in various applications. The sealant may be any pumpable material, such as polyurethane, silicone or plastisol. This technology produces a foam without any chemical reaction, without any chemical blowing agent and without any volatiles. Since chemical reactions are not used in the foaming process, the chemical composition of the sealant material is not changed. Foamed sealants retain their basic physical properties such as temperature and chemical resistance. The gas content of the foamed material is typically 50% by volume, but the amount of gas in the solution can be adjusted to control material durometer, compression set resistance and flexibility. The use of this "foam-in-place" technology reduces the use of expensive materials such as polyurethanes and silicones and provides improved compressibility, improved resilience and reduced cure time. The technology is advantageously used to produce foam sealant which can be applied by robotic devices, replacing the old, labor-intensive manual method of applying die-cut gaskets. Automated foam-in-place gasketing increases production, reduces labor and material costs, and improves quality through accurate and consistent gasket placement.

Whether dispensing "high" viscosity foam materials or lower viscosity foam adhesives, it is very important to maintain proper pressure on the polymer/gas solution through the dispensing process. Wide pressure fluctuations can result in premature formation of the foam within the dispenser if the pressure of the solution falls below the critical pressure level required to maintain the gas in solution. If the foam forms prematurely, the foam can shear as it leaves the dispenser, creating a foam layer with an uneven texture which not only is presents a rough appearance but also reduces the effectiveness of the foam. Conversely, if the pressure on the polymer/gas solution is too high within the dispenser, the gas will not readily leave solution when the material is dispensed. These problems increase when the foamed polymeric materials are dispensed intermittently in a production environment. When the polymeric material is dead-ended or stopped within the dispenser, unsatisfactory variations in the amount of material discharged from the dispenser can occur, and each opening and closing of the valves associated with the dispenser to obtain intermittent discharge of material can result in pressure fluctuations.

Many of the problems associated with intermittent application of high viscosity polymeric materials have been addressed in U.S. Pat. No. 5,207,352, to Porter et al. which discloses an apparatus for dispensing a solution of highly viscous polymeric material and a gas which comprises a dispenser, a pressure regulator and a swivel mount, all of which are interconnected to one another. The pressure regulator is adapted to be connected to a source of a pressurized polymer/gas solution either directly or through the swivel mount. The solution is transmitted through the pressure regulator directly into a fluid passageway formed in the dispenser body of the dispenser. Minimal pressure drop due to line losses occurs because of the close proximity of the pressure regulator and dispenser, and the solution is maintained under high pressure within the fluid passageway in the dispenser to the discharge outlet of a nozzle carried by the dispenser. This configuration maintains the gas in solution in the polymeric material within the dispenser body until it is discharged from the nozzle to atmosphere to form a homogeneous foam having gas cells substantially evenly distributed through the polymeric material.

As indicated in U.S. Pat. No. 5,207,352, it is very important to maintain the proper pressure on the polymer/gas solution throughout the dispenser until the material emerges from the dispenser to atmospheric pressure and the gas can evolve from the solution to form the foam. These problems are magnified if the material is dispensed in a wide band instead of a small bead. It would be very desirable to apply hot foam adhesives in a wide band in the manufacture of various products. For example, in the manufacture of disposable diapers or training pants as shown in U.S. Pat. No. 5,246,433, a hot melt adhesive is applied to a flap member using a melt blown application system. However, heretofore it has not been possible to dispense a pressurized polymer/gas solution to provide a wide band of foam material. The addition of another dimension to the dispensing profile greatly complicates the task of maintaining the proper pressure on the polymer/gas solution within the dispenser.

In order to dispense the solution in a wide band, a slot-type dispenser must be used, and many inherent problems arise in attempting to dispense solution through a slot dispenser. The material must be uniformly distributed across the width of the slot. In addition, as the material is distributed across the width of the slot, the pressure must be maintained on the solution to prevent premature foaming of the material. If the material begins to foam before it has left the dispenser, the foam shears as it leaves the dispenser, and as it is applied to the substrate. This premature shearing of the finished foam produces a layer of material having a unacceptably rough texture and reduces the effectiveness of the foam. In addition, the flowrate of the material leaving the dispenser must match the rate at which the substrate passes beneath the dispenser. The configuration of the slot and of the distribution manifold leading to the slot must be capable of being used with different materials having different viscosities and at various flowrates, so that the dispenser can be used over a range of production rates.

SUMMARY OF THE INVENTION

The present invention provides a method and apparatus for dispensing a pressurized polymer/gas solution through an elongated slot to produce a foam material. In accordance with the present invention, the polymer/gas solution is maintained above the critical pressure until the material reaches the exit section of the slot so that premature foaming of the material is prevented.

The dispensing apparatus of this invention is designed with a slot having an elongated exit slot section of substantially constant width and substantially constant thickness. The material is above the critical pressure at the inlet to the exit slot section and, the material is at atmospheric pressure at the outlet to the exit slot section where the foams begins to form. The exit slot section is designed so as to minimize the residence time of the material where the material is below the critical pressure and thus minimize premature foaming.

Upstream of the exit slot section is a converging slot section which provides a transition from a enlarged slot section to the smaller exit slot section. The converging slot section is configured with a substantially constant width, but with a gradually decreasing thickness in the downstream direction. The pressure drop of the material through the converging slot section is compensated for by increasing the supply pressure of the material so that the material is maintained at the critical pressure until it reaches the inlet of the exit slot section.

The method and apparatus of the present invention includes a distribution manifold upstream of the exit slot to distribute the polymer/gas solution across with the width of the slot to produce a smooth, even band of foam material. The distribution manifold may be configured so as to maintain a substantially even shear rate throughout the distribution manifold. Although the shear rate varies with flowrate, the material remains at a even shear rate for a given flow rate, and since viscosity is a function of shear rate, the effectiveness of the distribution manifold is essentially independent of the viscosity of the material. This allows the design of the distribution manifold to work for a wide range of flow rates. Although any suitable design of distribution manifold may be used, a coathanger-type distribution manifold is preferred.

These and other advantages are provided by the present invention of apparatus for dispensing a polymer foam which comprises means for forming a pressurized solution of intermixed polymeric material and gas. The polymeric material remains intermixed with the gas while the solution is maintained above a critical pressure. The apparatus also comprises means for dispensing the pressurized solution in wide band through an elongated slot. The solution is maintained above the critical pressure until just before the solution emerges from the elongated slot.

DETAILED DESCRIPTION OF THE PREFERRED EMBODIMENT

Figure 1:
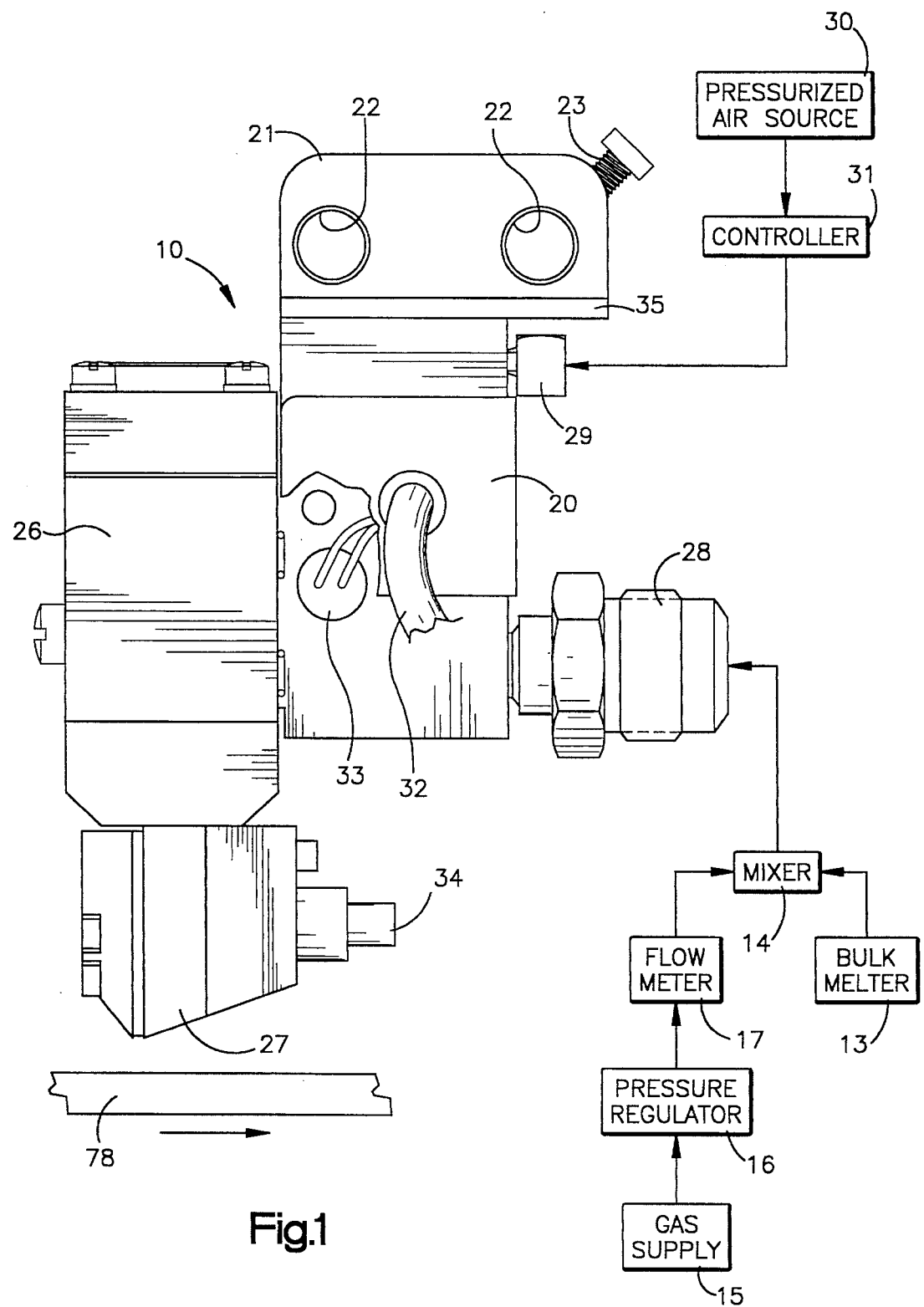
FIG. 1 is a representation of one embodiment of the present invention which includes a side elevational view of a dispensing gun and a schematic view of systems for supplying polymer/gas solution and control air to the gun.

Referring more particularly to the drawings and initially to FIG. 1, there is shown a dispensing apparatus including a dispensing gun 10 connected to a source of a polymer/gas solution. One method and apparatus of producing a solution of polymeric material and gas in preparation for application and foaming by the dispensing gun 10 is disclosed in U.S. Pat. No. 4,778,631 to Cobbs, Jr. et al., owned by the assignee of this invention, the disclosure of which is incorporated by reference in its entirety herein. Although the pressurizing, mixing and delivery system described in the aforesaid patent may be used, it is preferred to use one of a system that is presently commercially available, such as the FoamMix® system sold by Nordson Corporation of Westlake, Ohio.

The pressurizing, mixing and delivery apparatus is schematically illustrated in FIG. 1 as it is connected to the dispensing gun 10. The apparatus employs a bulk source of polymeric material such as a bulk melter 13 containing a heating means for liquefying a solid or semi-solid polymer material and pumping it from a tank. An example of a bulk melter is shown in U.S. Pat. No. 4,073,409, assigned to the assignee of this invention, the disclosure of which is incorporated by reference in its entirety herein. The pump associated with the bulk melter 13 is a cartridge-type gear pump, however, any pump capable of providing sufficient pressure to pump the material from the bulk melter is suitable.

The polymeric material is conveyed through a line which may be a hose capable of conveying heated material under pressure to the upstream end of a mixer 14 where the material is injected into the mixer. Foaming gas is supplied to the disk mixer 14 from a pressurized gas supply 15 through a gas line. A pressure regulator 16 and a flow meter 17 are connected in the gas line and permit control of gas pressure and flow rate, respectively, to the mixer 14. As schematically illustrated in FIG. 1, the gas is supplied from the gas supply 15 to the mixer 14 directly through the gas line.

As described in detail in U.S. Pats. Nos. 4,778,631 and 5,207,352, and as used herein, the term "polymer/gas" solution is meant to refer to a combination of thermoplastic or thermosetting polymeric material and gases such as air, nitrogen, oxygen, carbon dioxide and a variety of other gases or mixtures thereof. The term "solution" is used to describe a pressurized mixture of liquid polymer and dissolved gas which remains as a mixture only so long as the mixture is maintained at or above a critical pressure and which, when subjected to atmospheric pressure, forms a foam in which the gas evolves from solution in the form of small bubbles which enlarge and cause the polymer material to expand volummetrically. The foam is formed without a chemical reaction by the mechanical process of allowing the gas in the pressurized solution to evolve from the solution when the pressure is reduced. The "critical pressure" is defined as the pressure above which the polymeric material and gas remain intermixed and below which the gas begins to evolve from solution to form the foam. As used in the specification and claims, the "solution" of polymeric material and gas is intended to define and encompass the broader generic definition of solution which is a homogeneous mixture of a gas and molten or liquid polymer, whether or not the gas molecules are in fact dissolved or dispersed among the polymer molecules.

Referring again to FIG. 1 the dispensing gun 10 comprises a body 20 which can be adjustability mounted to a frame by means of a mounting block 21 attached to the top of the body. The mounting block 21 has mounting holes 22 lined with sliding sleeves through which portions of the frame may extend. Once positioned on the frame, the mounting block 21 is secured in position by means of a set screw 23 or other suitable means.

A control module 26 is attached to the front of the body 20. A dispensing nozzle assembly 27 is attached to the bottom of the control module 26. A hose connector 28 extends from the rear of the control module 26 and is adapted to be connected to hose connected to the mixer 14 providing the pressurized supply of the polymer/gas solution. An elbow connector 29 extends from the body 20 near the mounting block and is used to connect the gun to a pneumatic control line. Pressurized control air is supplied to the gun from a pressurized air source 30, and the supply of the air is operated by a controller 31 as shown schematically in FIG. 1. Extending from one side of the body 20 is a connecting cord 32 for attachment to an electric heater 33 and a thermocouple 34. The heater 33 is used to heat the body 20 and the control module to maintain the temperature of the polymer/gas solution during the dispensing operation. The thermocouple 34 measures the temperature of the body 20 to assure that the polymer/gas solution is within an acceptable temperature range when it is applied. An insulating layer 35 is provided between the body 20 and the mounting block 21 to avoid heating the mounting block and the frame.

Figure 2:
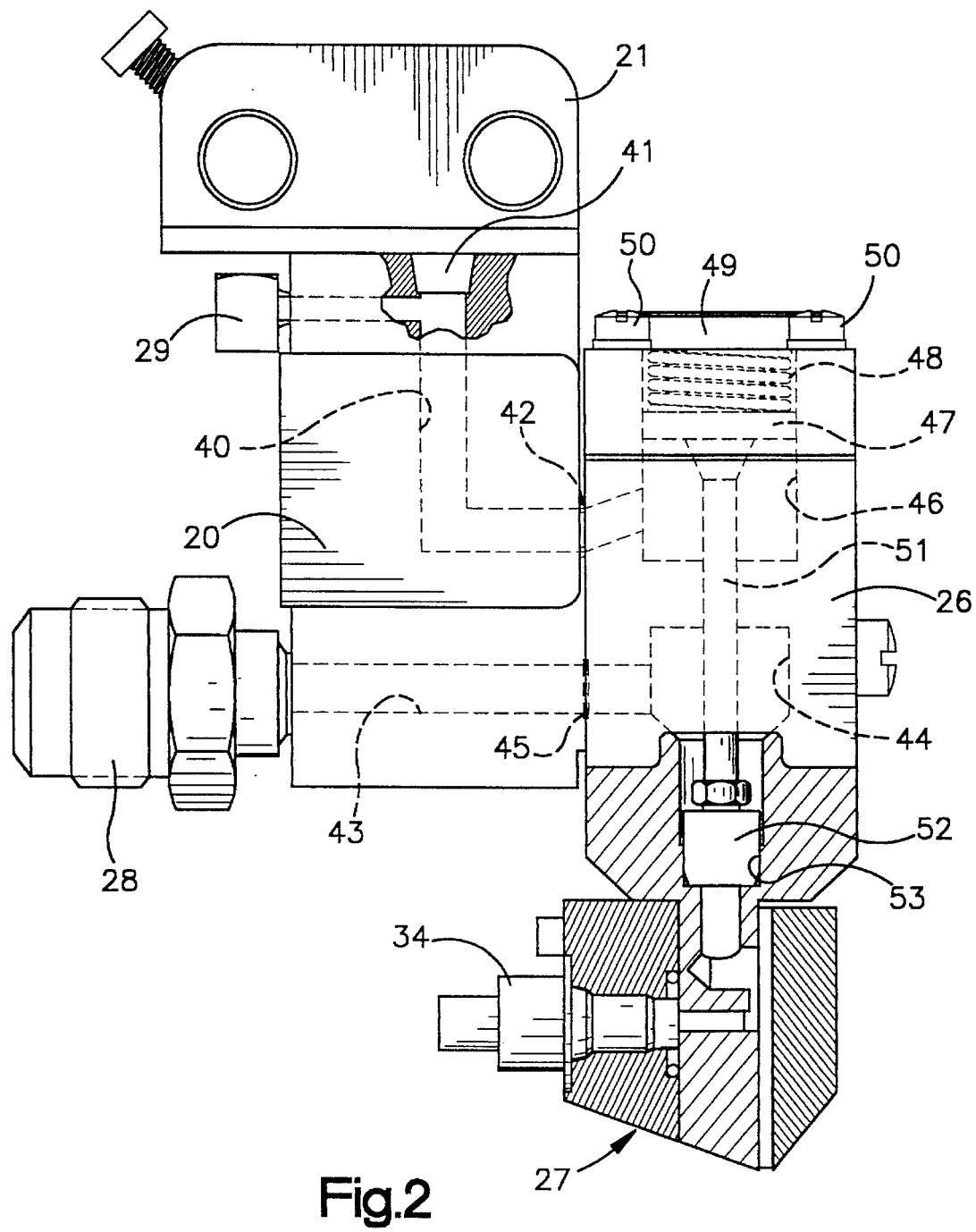
FIG. 2 is a detailed side sectional view of the dispensing gun of FIG. 1.

The interior of the dispensing gun 10 shown in FIG. 1 is depicted in FIG. 2. A pneumatic control passage 40 extends from the elbow connector 29 through the body 20 and into the module 26. The portion of the passage 40 near the mounting block 21 is closed by a plug 41. A suitable sealing ring 42 may be supplied between the body 20 and the module 26 where the passage 40 passes therebetween. The polymer/gas solution is supplied to the body 20 from the hose connector 28 through a passage 43 extending across the body 20 and into the module 26 to a chamber 44 located in the module. A suitable sealing ring 45 may be supplied between the body 20 and the module 26 where the passage 43 passes therebetween. The interior of the module 26 also includes a pneumatic cylinder 46 connected to the passage 40. A piston 47 is disposed within the cylinder 46. Within the cylinder 46 above the piston 47 is a spring 48 which urges the piston downwardly. The top of the cylinder 46 is covered by a cover 49 secured by screws 50. The pneumatic flow from the passage 40 is connected to the cylinder 46 below the piston 47, so that the pneumatic pressure moves the piston 47 upwardly in opposition to the spring 48. A rod 51 is connected to the piston 47 and extends from the cylinder 46 downwardly into the chamber 44. The rod 51 actuates a suitable valving mechanism, such as a ball valve member 52 mounted on the bottom of the rod which engages a valve seat 53 located in the chamber 44. Thus, actuation of the pneumatic flow controls the flow of the polymer/gas solution through the gun.

Figure 3:
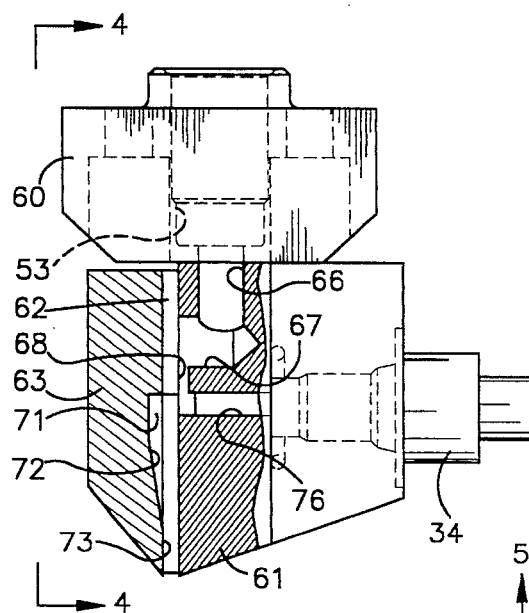
FIG. 3 is a detailed side sectional view, partially sectioned, of the nozzle assembly portion of the dispensing gun of FIG. 3 to a larger scale.
Figure 4:
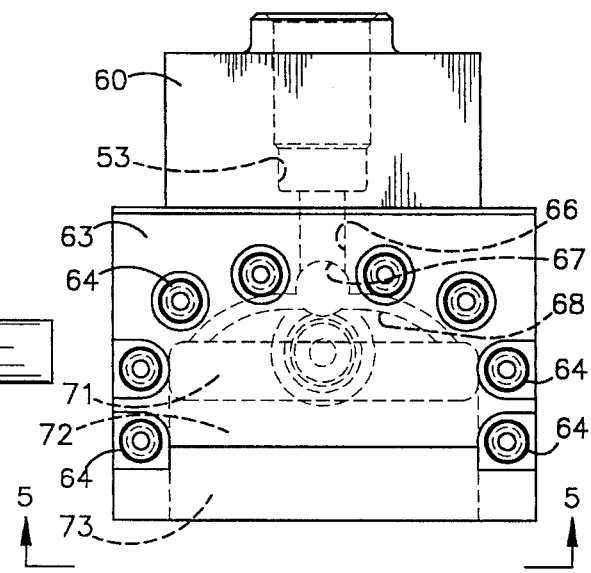
FIG. 4 is a front elevational view of the nozzle assembly of FIG. 3, taken along line 4—4 of FIG. 3.
Figure 5:
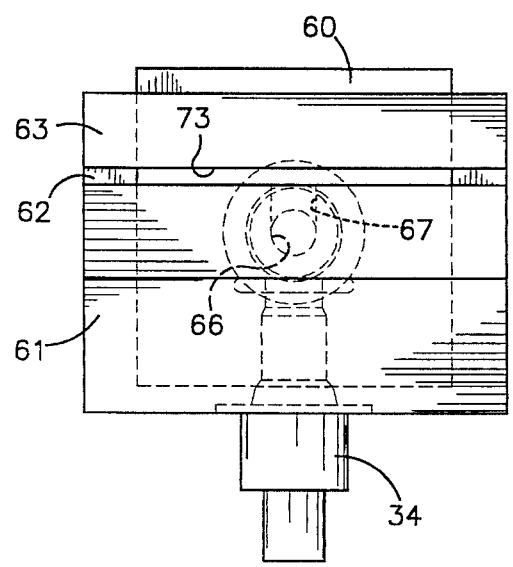
FIG. 5 is a bottom sectional view of the nozzle assembly of FIGS. 3 and 4 taken along line 5—5 of FIG. 3.

The dispensing nozzle assembly 27 is shown in more detail in FIGS. 3, 4 and 5. The nozzle assembly 27 comprises a mounting member 60 attached to the bottom of the module 26. A main nozzle member 61 is attached to the bottom of the mounting member 60 and receives the polymer/gas solution from the chamber 44 in the module 26. A shim member 62 is attached to the front of the nozzle member 61 by means of a shim clamp member 63 and a plurality of fasteners, such as cap screws 64.

When the ball valve member 52 is spaced from the valve seat 53, the valve is open and the pressurized polymer/gas solution enters the nozzle assembly 27 through a vertical passage 66 extending through the valve seat 53 and into the main nozzle member 61. From the passage 66, the pressurized solution travels into a transverse passage 67 extending from the bottom of the vertical passage 66 to the shim member 62. A distribution manifold 68 is located at the outlet of the transverse passage 67 along the front of the nozzle member 61 adjacent to the shim member 62. The distribution manifold 68 serves to distribute the polymer/gas solution across the width of the dispensing nozzle assembly 27. Preferably, the distribution manifold 68 is a "coathanger" type manifold which may be designed in accordance with known techniques of design of such manifolds. However, any other type of distribution manifold may be used to distribute the pressurized polymer/gas solution across the width of the nozzle assembly. A typical width for the application of polymer/gas solution using this invention is 1.5 inches, although any desired width can be used.

From the distribution manifold 68, the pressurized polymer/gas solution proceeds through the slot from which it is dispensed from the nozzle. The slot comprises three sections, an enlarged slot section 71, a converging slot section 72, and an exit slot section 73. As used in this description and in the claims, the "width" of the slot and the slot sections refers to the wide dimension generally perpendicular to the direction of flow of the polymer/gas solution through the slot, or the dimension shown extending from left to right in FIGS. 4 and 5; the thickness of the slot and the slot sections refers to the narrow dimension generally perpendicular to the direction of flow of the polymer/gas solution through the slot, or the dimension shown extending from left to right in FIG. 3 and from top to bottom in FIG. 5; the length of the slot section is the dimension generally parallel to the direction of flow of the polymer/gas solution, or the dimension shown extending from top to bottom in FIGS. 3 and 4.

The pressurized polymer/gas solution first enters the enlarged slot section 71 which is formed in the shim member 62 and extends into an adjacent portion of the shim clamp member 63. The enlarged slot section 71 is formed in part by the outlet or "land" portion of the coathanger-type distribution manifold 68. The enlarged slot section 71 provides a chamber containing a pressurized supply of solution for the downstream slot sections. Extending from the enlarged slot section 71 is a passage 76 extending to the thermocouple 34 so that the thermocouple measures the temperature of the polymer/gas solution in the enlarged slot section.

At the outlet of the enlarged slot section 71 is the converging slot section 72 having a substantially constant width and having a thickness which gradually decreases in the downstream direction. The converging slot section 72 reduces the thickness of the slot from the enlarged thickness needed to provide the supply chamber of the enlarged slot section 71 to the much smaller thickness required to dispense the foam. The converging slot section 72 should be designed such that fully developed flow is maintained throughout this section. In addition, the converging slot section 72 has a constantly decreasing thickness in order to facilitate estimation of pressure drops through the section.

At the bottom of the converging slot section 72 is the exit slot section 73 formed in the shim member 62. The exit slot section 73 has a substantially constant thickness and a substantially constant width. The pressure of the polymer/gas solution at the inlet to the exit slot section 73 should be above the critical pressure of the solution. By the time the solution reaches the outlet of the exit slot section 73, the pressure of the solution will have dropped to atmospheric pressure. The dimensions of the exit slot section 73 thus minimize the residence time of the solution flow near or below the critical pressure. A typical thickness for the exit slot is 0.016 inches. Thus the dispensing gun produces a wide ribbon of the foam material, with a typical dimension of 1.5 inches wide and 0.030 inches thick or greater depending upon the foam density ratio. Of course, the actual dimensions can be varied as desired depending upon the application of the material.

The converging slot section 72 and the exit slot section 73 are designed so that a proper pressure drop of the polymer/gas solution is achieved and the pressure of the polymer/gas solution is maintained above the critical pressure until the polymer/gas solution exits from the slot. The polymer/gas solution thus reaches the critical pressure so that gas evolves from the solution in the form of small bubbles causing the material to expand volummetrically and foam just as it exits the nozzle. The residence time of the material at pressures below the critical pressure is minimized or eliminated.

The pressure of the polymer/gas solution at the inlet to the exit slot section 73 should be above the critical pressure of the solution. If, however, a polymer/gas solution flows at a rate significantly slower than the rate for which the nozzle is designed, the point at which the solution drops below the critical pressure may move slowly into the converging slot section 72. Since the converging slot section 72 is designed with a small converging angle, reasonable foam quality is maintained.

As shown in FIG. 1, a substrate 78 is moved beneath the nozzle assembly 27 at a predetermined production rate and the polymer/gas solution exiting the slot is applied to the substrate as it moves beneath the nozzle assembly. The flow of the polymer/gas solution through the nozzle assembly must be such that the exit velocity of the solution matches the velocity of the substrate as it passes beneath the nozzle, so that a smooth even layer of the foam is dispensed onto the substrate. The substrate velocity will typically vary in most production environments, so the design of the slot must be such that the flow of the polymer/gas solution is capable of being varied to match changes in the substrate speed.

Example

The dimensions of the distribution nozzle can be calculated in accordance with this invention for a specific example. The starting parameters are
- the line speed, or the speed at which the substrate 78 passes beneath the dispensing gun 10,
- the width W of the slot, or the applied width of the band of foam,
- the loft of the applied material, or thickness of the foam material above the substrate after it has been applied,
- the "add-on" or the weight of material applied per unit area of substrate, and
- the density reduction or percent by which the density of the polymer/gas solution decreases after it is released from its pressurized state and the material fully foamed.

For this example, the following values are used:
- the line speed is 1,000 ft/min,
- the width W is 1.5 inches,
- the loft of the applied material is 0.040 inches,
- the add-on is 0.15 g/in$^2$, and
- the density reduction is 77%.

Based upon the above values, the flowrate of the unfoamed pressurized polymer/gas solution can be calculated. From these values, the flowrate of the polymer/gas solution is 2.802 in$^3$/sec.

The dimensions of the slot can then be determined. The dimensions of the slot are shown schematically in FIG. 6. Based upon the above given values, the thickness $H_2$ of the exit slot section 73 is calculated. The exit thickness $H_2$ is essentially the unfoamed thickness of the polymer/gas solution. In other words, $H_2$ matches the unfoamed polymer/gas solution height needed to produce the desired loft based upon the given density reduction. In this example the exit thickness $H_2$ is 0.016 inches.

In this example, the material being applied in a pressurized polymer/gas solution is a typical adhesive having a density of 0.98 g/cm$^3$. The viscosity of the material is calculated using the following formula:

$$\text{Viscosity} = \frac{V_0}{\left(1 + \frac{\text{Shear Stress}}{T}\right)^{(a-1)}}$$

where $V_0$ is 0.004291 lb/in$^2$-sec, T is 1.155278 lb/in$^2$, and a is 2.2077 for the adhesive polymer of this example.

From the desired exit thickness $H_2$ of 0.016 inches, the length $L_3$ of the exit slot section 73 is calculated. Along the length $L_3$ the pressure of the polymer/gas solution must drop from the critical pressure to atmosphere, so $L_3$ must be long enough so that the critical pressure is maintained at the entrance to $L_3$, and $L_3$ is chosen so that the pressure drop along $L_3$ is greater than the critical pressure. Using the values in this example the length $L_3$ is chosen as 0.1 inches.

Figure 6:
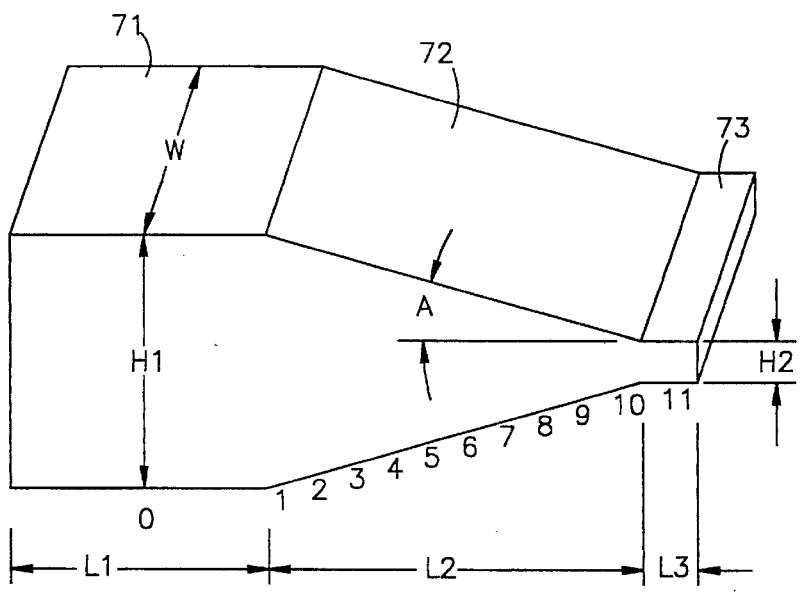
FIG. 6 is a schematic representation of the slot sections of the dispensing gun of FIGS. 1–5.
Figure 6A:
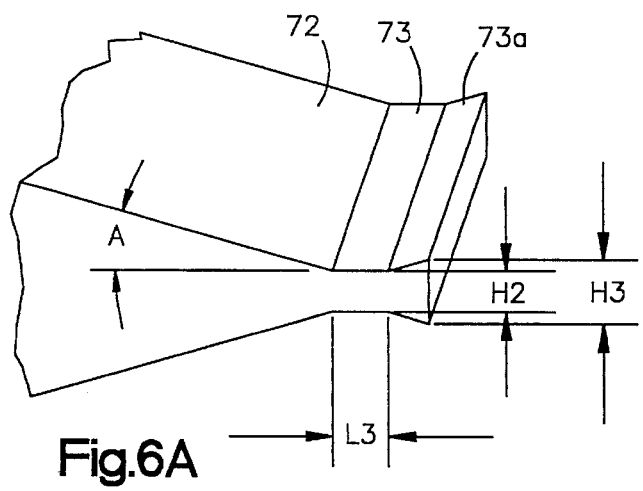
FIG. 6a is a schematic representation of a portion of slot section similar to FIG. 6 showing an alternative exit slot section configuration.

If the length of $L_3$ is such that the volume of material in the exit slot section 73 results in a residence time that is more than a small fraction of a second at the operative flowrate, a short diverging section 73a should be added as shown in FIG. 6a. This increases the exit thickness from $H_2$ to $H_3$ so that the material flows through the $L_3$ region faster but has the proper exit velocity. If such a diverging section 73a is added the thickness $H_2$ is decreased, and $H_3$ becomes the exit thickness which is essentially the unfoamed thickness of the polymer/gas solution.

After determining the dimensions of the exit slot section 73, the dimensions of the converging section 72 of the slot are determined. The dimensions of the converging slot section 72 depend upon the converging angle or taper angle A of the converging section and the length $L_2$ of the converging section. A shallow converging angle A which is chosen must be small enough to maintain fully developed flow throughout the converging section. For a given angle A and length $L_2$, the pressure drop and shear rate can be calculated at spaced positions along the length of the converging section using an Ellis model. Table 1 shows such a calculation using an angle A of 5.6°, and a length $L_2$ of 0.3 inches, and includes a calculation of the pressure drop along the length $L_3$ and along the length $L_1$ of the slot section leading to the converging section. Table 1 also includes a calculation of the pressure drop in the feed line leading to the slot, in which the feed line is assumed to be a cylindrical line having a constant circular cross section of 0.625 inches and a length of 120 inches.

The pressure drops in Table 1 are calculated using an equation from *Principles of Polymer Processing*, by Tadmor and Gogos, 1979, published by John Wiley & Sons of New York, page 568. For an infinitely wide slit this gives the following equation for flow Q as a function of pressure P for an Ellis fluid:

$$Q = \frac{WH^3P}{12 V_0 L}\left[1 + \left(\frac{3}{2+a}\right)\left(H\frac{P}{2LT}\right)^{(a-1)}\right]$$

Since it is not possible to solve this algebraically for pressure, an iterative solver, such as Newton's method, is used to adjust the pressure P to obtain the specified flow of 2.802 in$^3$/sec.

TABLE 1

| | Position Number, n (See FIG. 6) | Length, $L_n$ (in) | Width, W (in) | Thickness, $H_n$ (in) | Shear Rate (1/sec) | Calculated Pressure Drop (psi) Ellis model) |
|---|---|---|---|---|---|---|
| | Line | 120 | 0.625 | 0.625 | 15 | 23.6 |
| $L_1$ | 0 | 0.6 | 1.5 | 0.075 | 1,993 | 44.6 |
| $L_2$ | 1 | 0.03 | 1.5 | 0.070 | 2,311 | 2.6 |
| | 2 | 0.03 | 1.5 | 0.064 | 2,713 | 3.1 |
| | 3 | 0.03 | 1.5 | 0.059 | 3,230 | 3.7 |
| | 4 | 0.03 | 1.5 | 0.054 | 3,909 | 4.5 |
| | 5 | 0.03 | 1.5 | 0.048 | 4,828 | 5.6 |
| | 6 | 0.03 | 1.5 | 0.043 | 6,113 | 7.0 |
| | 7 | 0.03 | 1.5 | 0.037 | 7,990 | 9.2 |
| | 8 | 0.03 | 1.5 | 0.032 | 10,884 | 12.5 |
| | 9 | 0.03 | 1.5 | 0.027 | 15,690 | 18.0 |
| | 10 | 0.03 | 1.5 | 0.021 | 24,558 | 27.9 |
| $L_3$ | 11 | 0.1 | 1.5 | 0.016 | 43,783 | 163.5 |
| | SLOT ($L_1$ + $L_2$ + $L_3$) | 1.0 | — | — | — | 302.2 |

The total pressure drop must not be so great as to allow the polymer/gas solution to drop below the critical pressure level; otherwise, premature foaming will occur. Assuming that the critical foaming pressure of the material is 150 psi, the 163.5 psi pressure drop calculated for length $L_3$ is sufficient to avoid formation of foam upstream of $L_3$. Based upon the calculations in Table 1, a pressure of 302 psi will be required to feed the slot at this flow rate.

The analysis in Table 1 as schematically depicted in FIG. 6, provides a suitable two dimensional configuration for the slot, including the dimensions of the converging section 72. Within the $L_2$ region it is necessary to provide the distribution manifold 68 to provide uniform flow across the width W of the slot. As discussed above, a suitable distribution manifold is a coathanger-type manifold, the design of which is well known in the art. Alternatively, other known manifold designs can be used. The configuration of the distribution manifold must assure that the pressure drop does not exceed acceptable limits as the polymer/gas solution is being distributed across the width of the slot. In addition, the distribution manifold should be configured so that similar shear rates occur throughout the manifold. With polymer materials such as those used in this example, viscosity varies with shear rate. By selecting a geometry to maintain a constant shear rate, the effectiveness of the distribution manifold is essentially independent of the viscosity of the material. This allows the design of the distribution manifold to work for a wide range of flow rates. With these goals, a suitable coathanger-type distribution manifold can be designed using known analysis, such as that set forth in *Extrusion Dies for Plastics and Rubber*, by Walter Michaeli, second revised edition, 1992, published by Hanser Publications of Munich and New York and distributed in the U.S. and Canada by Oxford University Press, particularly pages 134–150. Such an analysis for this example is set forth in Table 2 below.

Figures 7, 8:
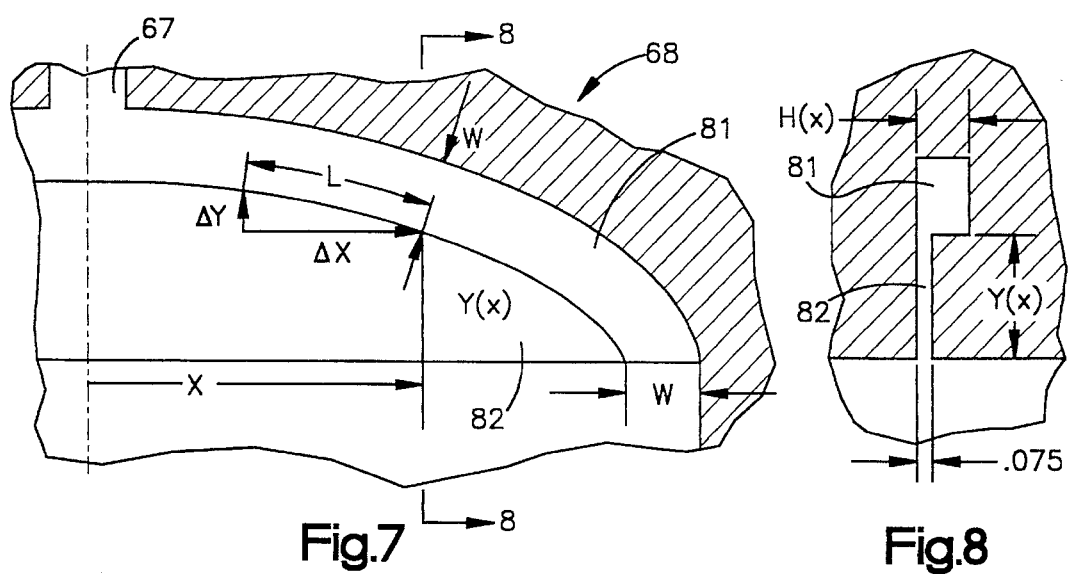
FIG. 7 is a cross section of the coathanger-type distribution manifold identifying various parameters.
FIG. 8 is a sectional view taken along line 8—8 of FIG. 7.
Figure 9:
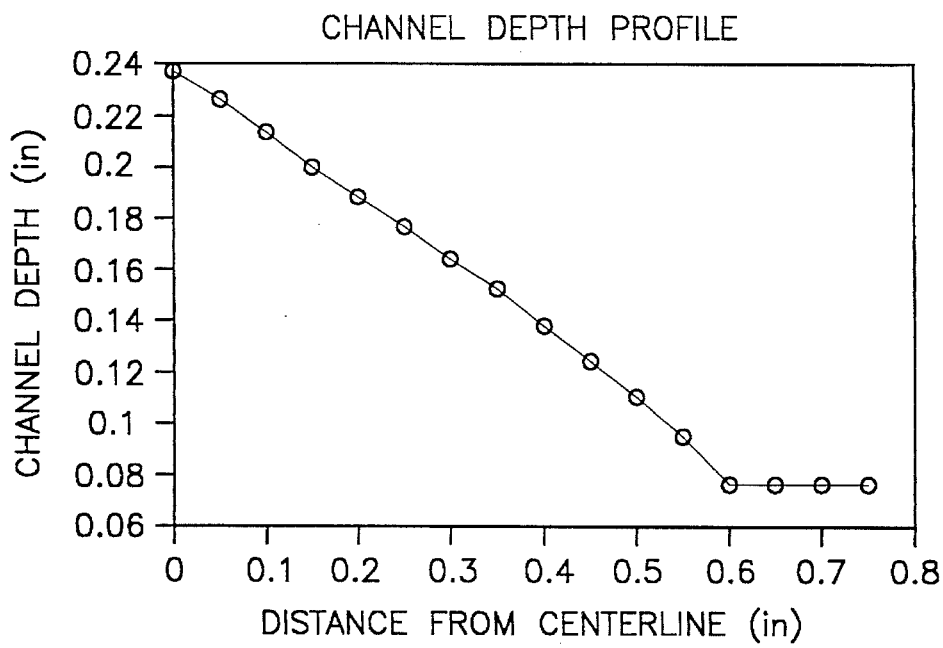
FIG. 9 is a graph depicting the channel depth profile of the coathanger-type distribution manifold.
Figure 10:
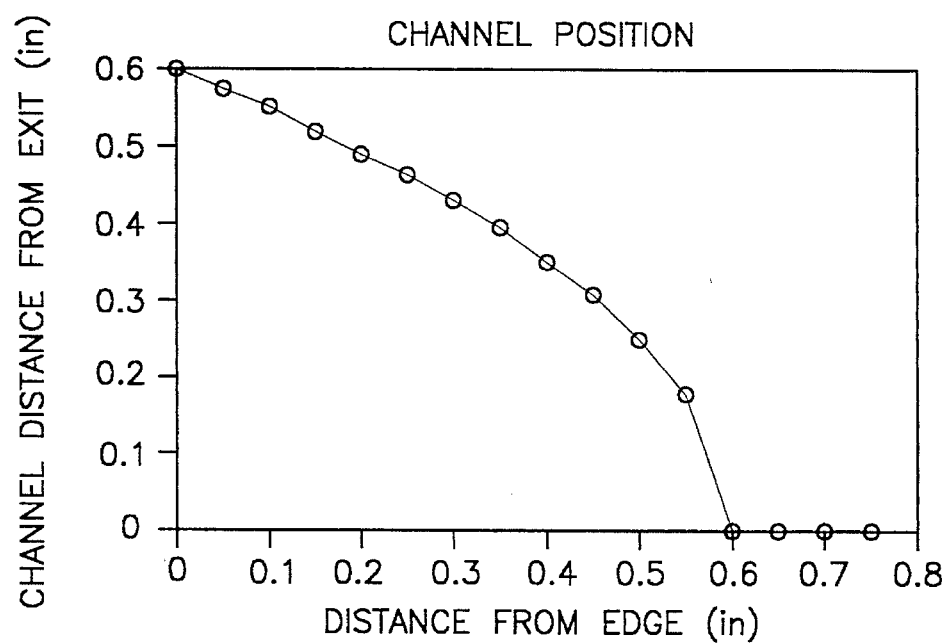
FIG. 10 is a graph depicting the channel position of the coathanger-type distribution manifold.

As shown generally in FIGS. 7 and 8, the distribution manifold comprises two parts, a curved channel 81 having the "coathanger" shape, and a thin slot or "land" 82 extending downstream from the channel. As shown in FIGS. 7 and 8 and as given in Table 2, x is the position of a coordinate measured from the centerline of the manifold, W is the width of the channel (which in this example is approximately 0.15 inches throughout the manifold), H is the depth of the channel (which varies for each position of x), and L is the flow distance of the fluid through the channel for each incremental increase in x. A graph showing the channel depth H as a function of x is presented in FIG. 9. From the dimensions H, W and x, the shape of the distribution manifold can be calculated. Also as shown in FIGS. 7 and 8, the distance from the exit of the distribution manifold to a particular point is y. FIG. 10 presents a graph showing the specific shape of the coathanger-type distribution manifold in which the distance from the outer edge of the slot is shown against the distance y from the exit of the coathanger.

For the specific dimensions of the distribution manifold in this example, the flowrate, shear rate and pressure drop can be calculated for each incremental position of x, and Table 2 presents these calculations. Table 2 includes a presentation of the pressure drop in the channel and along the land of the manifold. The calculations of table assume that the total flowrate of the fluid at the exit of the distribution manifold is 2.802 in³/sec, as calculated above, the polymer/gas solution has the same density 0.98 g/cm³ as given above, and that the viscosity of the polymer/gas solution is as calculated above for Table 1.

The pressure drops in Table 2 are calculated using the same equation from *Principles of Polymer Processing*, by Tadmor and Gogos, discussed above. Since the channel in Table 2 is nearly a square channel, not an infinitely wide slit, it is necessary to correct this equation for aspect ratio. This is done by multiplying the result of the above equation by $F_p$ as shown in the graph on page 573 of Tadmor and Gogos. H/W is then calculated and the flow Q is reduced by the fraction $F_p$. The following curve fit is used to approximate this graph:

$$F_p = 1.01059 + 0.17591 \left(\frac{H}{W}\right)^2 - 0.762077 \left(\frac{H}{W}\right)$$

TABLE 2

| X (in) | W (in) | H (in) | L (in) | Calculated Pressure Drop (psi) Land | Calculated Pressure Drop (psi) Channel | Flow-rate (in³/sec) | Shear Rate (l/sec) |
|---|---|---|---|---|---|---|---|
| 0.00 | 0.15 | 0.237 | 0.056 | 1.9 | 1.9 | 1.401 | 994 |
| 0.05 | 0.15 | 0.225 | 0.057 | 2.0 | 2.0 | 1.308 | 1,032 |
| 0.10 | 0.15 | 0.213 | 0.057 | 2.1 | 2.1 | 1.214 | 1,074 |
| 0.15 | 0.15 | 0.200 | 0.058 | 2.2 | 2.2 | 1.121 | 1,120 |
| 0.20 | 0.15 | 0.187 | 0.059 | 2.4 | 2.4 | 1.027 | 1,170 |
| 0.25 | 0.15 | 0.175 | 0.060 | 2.6 | 2.6 | 0.934 | 1,223 |
| 0.30 | 0.15 | 0.162 | 0.062 | 2.8 | 2.8 | 0.841 | 1,280 |
| 0.35 | 0.15 | 0.149 | 0.065 | 3.1 | 3.1 | 0.747 | 1,341 |
| 0.40 | 0.15 | 0.136 | 0.068 | 3.5 | 3.5 | 0.654 | 1,406 |
| 0.45 | 0.15 | 0.123 | 0.074 | 4.2 | 4.2 | 0.560 | 1,479 |
| 0.50 | 0.15 | 0.109 | 0.087 | 5.4 | 5.4 | 0.467 | 1,563 |
| 0.55 | 0.15 | 0.093 | 0.180 | 13.1 | 13.1 | 0.374 | 1,719 |
| 0.60 | 0.15 | 0.075 | 0.050 | | | | 1,993 |
| 0.65 | 0.15 | 0.075 | 0.050 | | | | 1,328 |
| 0.70 | 0.15 | 0.075 | 0.050 | | | | 664 |
| 0.75 | 0.15 | 0.075 | | | | | |
| Distribution Manifold Total | | | | 45.3 | 45.3 | | |

The dimensions of the distribution manifold shown in Table 2 have been adjusted so that the shear rate remains relatively constant throughout the manifold. This allows the manifold to operate effectively for various viscosities and for the design to be essentially independent of material viscosity.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way this is inconsistent with the extent to which the progress in the art has been advanced by the invention.

What is claimed is:

1. Apparatus for dispensing a polymer foam, which comprises:

a supply system which forms and supplies a pressurized solution of intermixed polymeric material and gas, the polymeric material remaining intermixed with the gas while the solution is maintained above a critical pressure, the mixture forming a foam when it is below the critical pressure; and a dispenser connected to the supply system to receive the pressurized solution therefrom, the dispenser having an elongated slot, the dispenser dispensing the pressurized solution in wide band through the elongated slot, the solution being maintained above the critical pressure until just before the solution emerges from the elongated slot.

2. The apparatus of claim 1 wherein the dispenser includes an elongated exit slot section.

3. The apparatus of claim 2 wherein the elongated exit slot section minimizes residence time of the solution while the solution is below the critical pressure to minimize premature foaming.

4. The apparatus of claim 2 wherein the elongated exit slot section has a substantially constant thickness and a substantially constant width.

5. The apparatus of claim 4 wherein the dispenser maintains the pressure of the solution above the critical pressure until the solution enters the exit slot section.

6. The apparatus of claim 2 wherein the dispenser includes a converging slot section located directly upstream of the exit slot section.

7. The apparatus of claim 6 wherein the converging slot section has a substantially constant width and a thickness which decreases in the downstream direction.

8. Apparatus for dispensing a polymer foam, which comprises:
- a supply system which forms and supplies a pressurized solution of intermixed polymeric material and gas, the polymeric material remaining intermixed with the gas while the solution is maintained above a critical pressure; and a dispenser connected to the supply system to receive the pressurized solution
  therefrom, the dispenser having an elongated slot, the dispenser dispensing the pressurized solution in wide band through the elongated slot, the solution being maintained above the critical pressure until just before the solution emerges from the elongated slot, the dispenser including an elongated exit slot section and a converging slot section located directly upstream of the exit slot section, the dispenser also including a distribution manifold located directly upstream of the converging slot section.

9. The apparatus of claim 8 wherein the distribution manifold distributes the solution across the width of the elongated slot.

10. The apparatus of claim 8 wherein the distribution manifold distributes the solution with substantially similar shear rates occur throughout the manifold.

11. The apparatus of claim 8 wherein the distribution manifold is a coathanger-shaped manifold.

12. Apparatus for dispensing a polymer foam in a wide ribbon onto a substrate moving at a speed, which comprises:
- a supply system which forms and supplies a pressurized solution of intermixed polymeric material and gas, the polymeric material remaining intermixed with the gas while the solution is maintained above a critical pressure, the mixture forming a foam when it is below the critical pressure; and
- a dispenser connected to the supply system to receive the pressurized solution therefrom, the dispenser having an elongated slot, the dispenser dispensing the pressurized solution in wide band through the elongated slot onto the moving substrate, the solution having a flowrate exiting from the elongated slot which is variable to match substantially the speed of the moving substrate, the dispenser including an elongated exit slot section having a substantially constant thickness and a substantially constant width, the dispenser maintaining the pressure of the solution above the critical pressure until the solution enters the exit slot section.

13. The apparatus of claim 12 wherein the exit slot section minimizes residence time of the solution while the solution is below the critical pressure to minimize premature foaming.

14. The apparatus of claim 12 wherein the dispenser includes a converging slot section located directly upstream of the exit slot section.

15. The apparatus of claim 14 wherein the converging slot section has a substantially constant width and a thickness which decreases in the downstream direction.

16. Apparatus for dispensing a polymer foam in a wide ribbon onto a substrate moving at a speed, which comprises:
- a supply system which forms and supplies a pressurized solution of intermixed polymeric material and gas; and
- a dispenser connected to the supply system to receive the pressurized solution therefrom, the dispenser having an elongated slot, the dispenser dispensing the pressurized solution in wide band through the elongated slot onto the moving substrate, the solution having a flowrate exiting from the elongated slot substantially matching the speed of the moving substrate, the dispenser including an elongated exit slot section having a substantially constant thickness and a substantially constant width, the dispenser maintaining the pressure of the solution above a critical pressure until the solution enters the exit slot section, the dispenser including a converging slot section located directly upstream of the exit slot section, the dispenser also including a distribution manifold located directly upstream of the converging slot section.

17. A dispenser for dispensing a polymer foam in a wide ribbon, which comprises:
- a body having a connector for attachment to a source of a pressurized solution of intermixed polymeric material and gas; and
- a nozzle assembly attached to the body and receiving the pressurized solution from the body and to maintain the solution above a critical pressure until just before the solution leaves the nozzle assembly, the nozzle assembly having an elongated slot through which the solution is dispensed from the nozzle assembly, the elongated slot including
  - an elongated exit slot section having a substantially constant thickness and a substantially constant width, the exit slot section minimizing residence time of the solution while the solution is below the critical pressure to minimize premature foaming,
  - a converging slot section located directly upstream of the exit slot section, the converging slot section having a substantially constant width and having a thickness which gradually de creases in the downstream direction, and
  - a distribution manifold located directly upstream of the converging slot section.

18. The dispenser of claim 17 wherein the distribution manifold is a coathanger-shaped manifold.

19. A method for dispensing a polymer foam, which comprises the steps of:
- forming a pressurized solution of intermixed polymeric material and gas, the polymeric material remaining intermixed with the gas while the solution is maintained above a critical pressure;
- maintaining the solution above the critical pressure to prevent premature foaming; and
- dispensing the pressurized solution in wide band using a dispenser having an elongated slot by directing the solution through the elongated slot while maintaining the solution above the critical pressure until the solution emerges from the elongated slot.

20. The method of claim 19 wherein the dispensing step includes dispensing the solution through an elongated exit slot section.

21. The method of claim 20 wherein residence time of the solution while the solution is below the critical pressure in the exit slot section is minimized to minimize premature foaming.

22. The method of claim 20 wherein the solution is dispensed through an elongated exit slot section which has a substantially constant thickness and a substantially constant width.

23. The method of claim 20 wherein the pressure of the solution is maintained above the critical pressure until the solution enters the exit slot section.

24. The method of claim 20 wherein the dispensing step includes directing the solution through a converging slot section before the solution is dispensed through the exit slot section.

25. The method of claim 24 wherein the solution is directed through a converging slot section which has a substantially constant width and a thickness which decreases in the downstream direction.

26. A method for dispensing a polymer foam, which comprises the steps of:

forming a pressurized solution of intermixed polymeric material and gas, the polymeric material remaining intermixed with the gas while the solution is maintained above a critical pressure;

maintaining the solution above the critical pressure to prevent premature foaming; and dispensing the pressurized solution in wide band using a dispenser having an elongated slot by directing the solution through the elongated slot while maintaining the solution above the critical pressure until the solution emerges from the elongated slot, including dispensing the solution through an exit slot section, directing the solution through a converging slot section before the solution is dispensed through the exit slot section, and directing the solution through a distribution manifold before the solution is directed through the converging slot section.

27. The method of claim 26 wherein the solution is directed through a distribution manifold which distributes the solution across the width of the elongated slot.

28. The method of claim 26 wherein variations in shear rate are minimized as the solution is directed through the distribution manifold.

29. The method of claim 26 wherein the solution is directed through a coathanger-shaped distribution manifold.

* * * * *

UNITED STATES PATENT AND TRADEMARK OFFICE
CERTIFICATE OF CORRECTION

PATENT NO. : 5,556,471
DATED : September 17, 1996
INVENTOR(S) : Boccagno et al.

It is certified that error appears in the above-indentified patent and that said Letters Patent is hereby corrected as shown below:

Column 10, line 37, "Ellis model)" should be —(Ellis model)—.
Column 10, line 49, "SLOT" should be —SLOT TOTAL—.
Column 10, line 64, "$L_2$" should be —$L_1$—.

Signed and Sealed this

Twenty-eighth Day of January, 1997

Attest:

BRUCE LEHMAN

Attesting Officer    Commissioner of Patents and Trademarks